(12) United States Patent
Raszuk et al.

(10) Patent No.: US 8,537,840 B1
(45) Date of Patent: Sep. 17, 2013

(54) ANGULAR DISTANCE CALCULATION FOR BGP BEST PATH SELECTION

(75) Inventors: Robert Raszuk, San Jose, CA (US); Christian Cassar, Middlesex (GB)

(73) Assignee: Cisco Technology, Inc., San Jose, CA (US)

( * ) Notice: Subject to any disclaimer, the term of this patent is extended or adjusted under 35 U.S.C. 154(b) by 187 days.

(21) Appl. No.: 13/190,867

(22) Filed: Jul. 26, 2011

(51) Int. Cl.
*H04L 12/28* (2006.01)

(52) U.S. Cl.
USPC ........... 370/400; 396/389; 370/351; 370/389; 370/401

(58) Field of Classification Search
USPC .................. 370/351, 389, 400, 401; 396/389
See application file for complete search history.

(56) References Cited

U.S. PATENT DOCUMENTS

| | | | |
|---|---|---|---|
| 7,647,426 B2 | 1/2010 | Patel et al. | |
| 7,675,912 B1 | 3/2010 | Ward et al. | |
| 7,885,277 B2 * | 2/2011 | Shaikh et al. | 370/401 |
| 7,957,306 B2 | 6/2011 | Bryant et al. | |
| 8,320,361 B2 * | 11/2012 | Mohapatra et al. | 370/351 |
| 2006/0291446 A1 * | 12/2006 | Caldwell et al. | 370/351 |
| 2010/0061381 A1 * | 3/2010 | Sundt et al. | 370/400 |
| 2010/0208744 A1 * | 8/2010 | Shaikh et al. | 370/408 |
| 2010/0220736 A1 | 9/2010 | Mohapatra et al. | |

OTHER PUBLICATIONS

Y. Rekhter and T. Li, "A Border Gateway Protocol 4 (BGP-4)", Request for Comments 1771, Mar. 1995, 54 pp.
Anderew S. Tanenbaum, "Computer Networks," Third Edition, Prentice-Hall 1996, pp. 28-38, and 521-542.
Radia Perlman, "Interconnections, Bridges and Routers," Addison Wesley Publishing Company (1992), pp. 323-329.
Y. Rekhter and T. Li "A Border Gateway Protocol 4 (BGP-4)" Internet Draft <draft-ietf-idr-bgp4-20.txt> (Apr. 2003), 172 pp.

\* cited by examiner

*Primary Examiner* — Hassan Kizou
*Assistant Examiner* — Hagomer Nasr
(74) *Attorney, Agent, or Firm* — Cesari and McKenna, LLP

(57) ABSTRACT

In one embodiment, an angular distance calculation technique may enable an intermediate node, such as a route reflector, to render customized best path selection decisions to destination address prefixes and advertise those decisions to its intermediate peering nodes, i.e., route reflector clients, in an autonomous system of a computer network. That is, the route reflector may execute a routing protocol, such as BGP, to select and advertise a next hop (e.g., an address prefix of an egress point of the autonomous system) associated with a customized best path to a route reflector client based on an angular distance between the route reflector client and the egress point. In this manner, the route reflector client may route data traffic destined to a destination address prefix utilizing the egress point associated with the customized best path to that prefix.

20 Claims, 7 Drawing Sheets

US 8,537,840 B1

ANGULAR DISTANCE CALCULATION FOR BGP BEST PATH SELECTION

TECHNICAL FIELD

The present disclosure relates generally to computer networks and, more particularly, to best path selection between nodes of a computer network.

BACKGROUND

An intermediate node, such as a router, may be used to interconnect communication links and nodes of a computer network maintained as one or more autonomous systems. A function of the router is to determine a node to which data traffic in the autonomous system may be directed. To accomplish such "routing", the router cooperates with other routers to determine best paths throughout the autonomous system using various routing protocols, such as the Border Gateway Protocol (BGP). Specifically, the routers exchange ("advertise") routing information among neighboring (peering) routers in the autonomous system, wherein the routing information may include destination address prefixes, i.e., portions of destination addresses used by the BGP routing protocol to render routing ("next hop") decisions.

Hot potato routing is an attempt to render a best path routing decision that directs the data traffic to a next hop (e.g., an exit or egress point of the autonomous system) that is closest to the router, e.g., a route reflector, rendering the decision. Note that an egress point is an exit point (e.g., a point of presence or a border router) of the autonomous system that may be utilized to reach a destination address prefix. Typically, the route reflector may render its decision based upon a position of the egress point with respect to itself, rather than the position of the egress point with respect to its peering router, i.e., a route reflector client. Note also that the route reflector client may be embodied as any type of router, including a border router deployed on the perimeter of the autonomous system. Therefore, the egress point associated with the best path rendered and advertised by the route reflector to the route reflector client may not be the best path to the destination address prefix.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an angular distance calculation technique may enable an intermediate node, such as a route reflector, to render customized best path selection decisions to destination address prefixes and advertise those decisions to its intermediate node peers, i.e., route reflector clients, in an autonomous system of a computer network. That is, the route reflector may execute a routing protocol, such as BGP, to select and advertise a next hop (e.g., an address prefix of an egress point of the autonomous system) associated with a customized best path to a route reflector client based on an angular distance between the route reflector client and the egress point. In this manner, and according to the embodiments described herein, the route reflector client may route data traffic destined to a destination address prefix utilizing the egress point associated with the customized best path to that prefix.

Specifically, a topology of the autonomous system may be configured as a set of elements (e.g., route reflector clients and egress points) arranged in a closed plane curve, (e.g., a circle), such that an angular distance between a route reflector client and each egress point for a destination address prefix can be determined. Each angular distance may thereafter be utilized in a customized best path selection calculation executed by the route reflector to select a closest egress point associated with a customized best path to the destination address prefix for the route reflector client. In an illustrative embodiment, the egress point that produces the smallest angular distance with the route reflector client may be deemed the closest egress point and thus associated with the customized best path. The route reflector may then advertise the customized best path to the route reflector client. Advantageously, the route reflector client may route traffic to the destination address prefix utilizing an egress point that is closest to the client in accordance with a customized best path, instead of an egress point that is closest to the route reflector.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Figure 1:
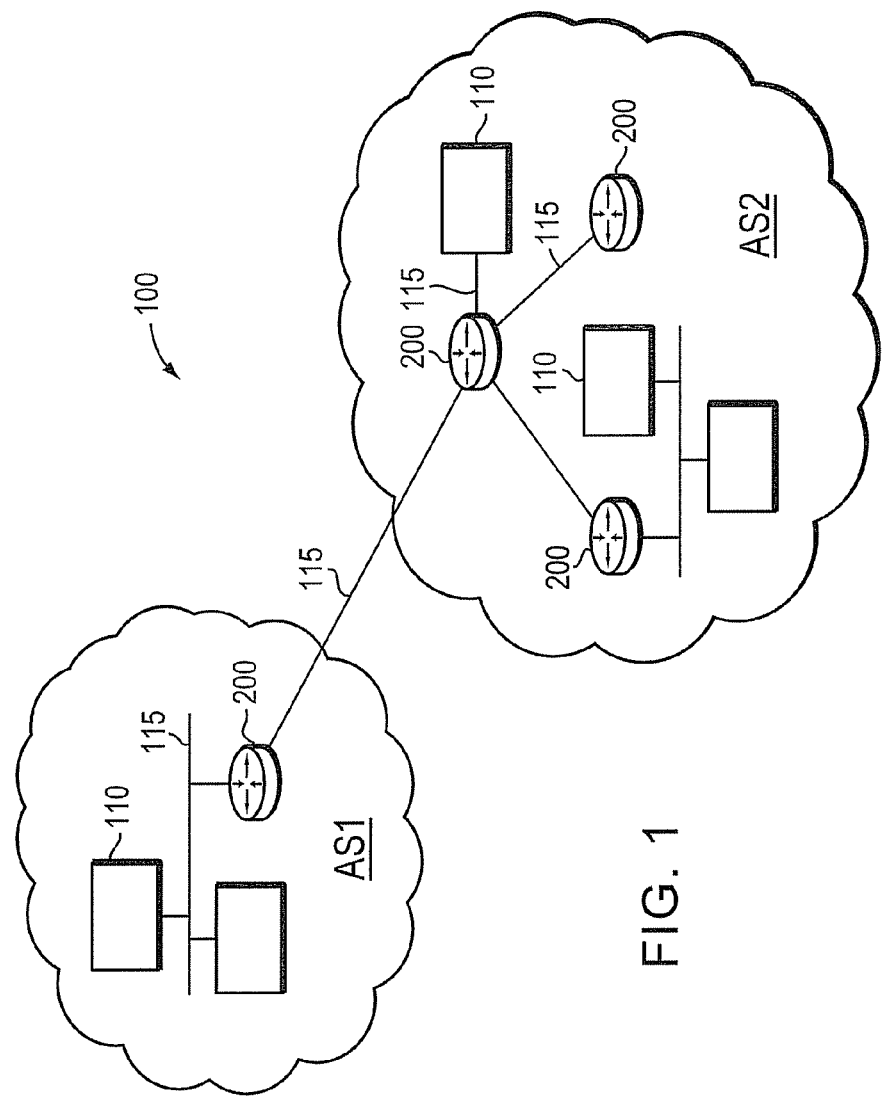
FIG. 1 illustrates an example computer network.

FIG. 1 is a schematic block diagram of an example computer network 100 illustratively comprising nodes interconnected by links. An intermediate node 200, such as a router, may be used to interconnect the communication links 115 and nodes 110 of the computer network, which may be maintained as one or more routing domains or autonomous systems AS1-2. Illustratively, the links and nodes within an autonomous system may be coupled together by conventional intradomain routers configured to execute intradomain routing protocols. It may be desirable, however, to increase the number of nodes capable of exchanging data; in this case, interdomain routers executing interdomain routing protocols may be used to interconnect nodes of the various autonomous systems AS1-2.

An example of an interdomain routing protocol is the Border Gateway Protocol version 4 (BGP), which performs routing between autonomous systems by exchanging routing and reachability information among neighboring routers of the systems. An adjacency is a relationship formed between selected neighboring (peering) routers for the purpose of exchanging routing information messages and abstracting the network topology. Before transmitting such messages, however, the peers cooperate to establish a logical "peer" connection (session) between the routers. BGP generally operates over a reliable transport protocol, such as the Transmission Control Protocol (TCP), to establish a TCP connection/session. The routing information exchanged by the peering routers typically includes destination address prefixes, i.e., the portions of destination addresses used by the routing protocol to render routing ("next hop") decisions. Examples of such destination addresses include Internet Protocol (IP) version 4 (IPv4) and version 6 (IPv6) addresses. The BGP routing protocol is well known and described in detail in *Request For Comments* (*RFC*) 1771, by Y. Rekhter and T. Li (1995), *Internet Draft <draft-ietf-idr-bgp4-20.txt>* titled, *A Border Gateway Protocol* 4 (*BGP*-4) by Y. Rekhter and T. Li (April 2003) and Interconnections, Bridges and Routers, by R. Perlman, published by Addison Wesley Publishing Company, at pages 323-329 (1992).

According to one or more embodiments disclosed herein, the autonomous system of computer network 100 may include a router, such as route reflector, interconnected with its peering routers, such route reflector clients. As known to those skilled in the art, the route reflector clients may be embodied as autonomous system border routers (ASBRs), provider edge devices (PEs), or other nodes that are deployed on a perimeter of the autonomous system and that may participate in external (or exterior) BGP (eBGP) sessions, as well as internal (or interior) BGP (iBGP) sessions, through the route reflector. The iBGP protocol is often used to distribute inter-network reachability information (address prefixes) among the routers in an autonomous system. To implement iBGP, the routers must typically be "fully meshed" (e.g., physically coupled) such that every router is interconnected with every other router by way of, e.g., a TCP connection. In the embodiments described herein, however, full meshing may be achieved by logically coupling the route reflector with its route reflector clients.

Figure 2:
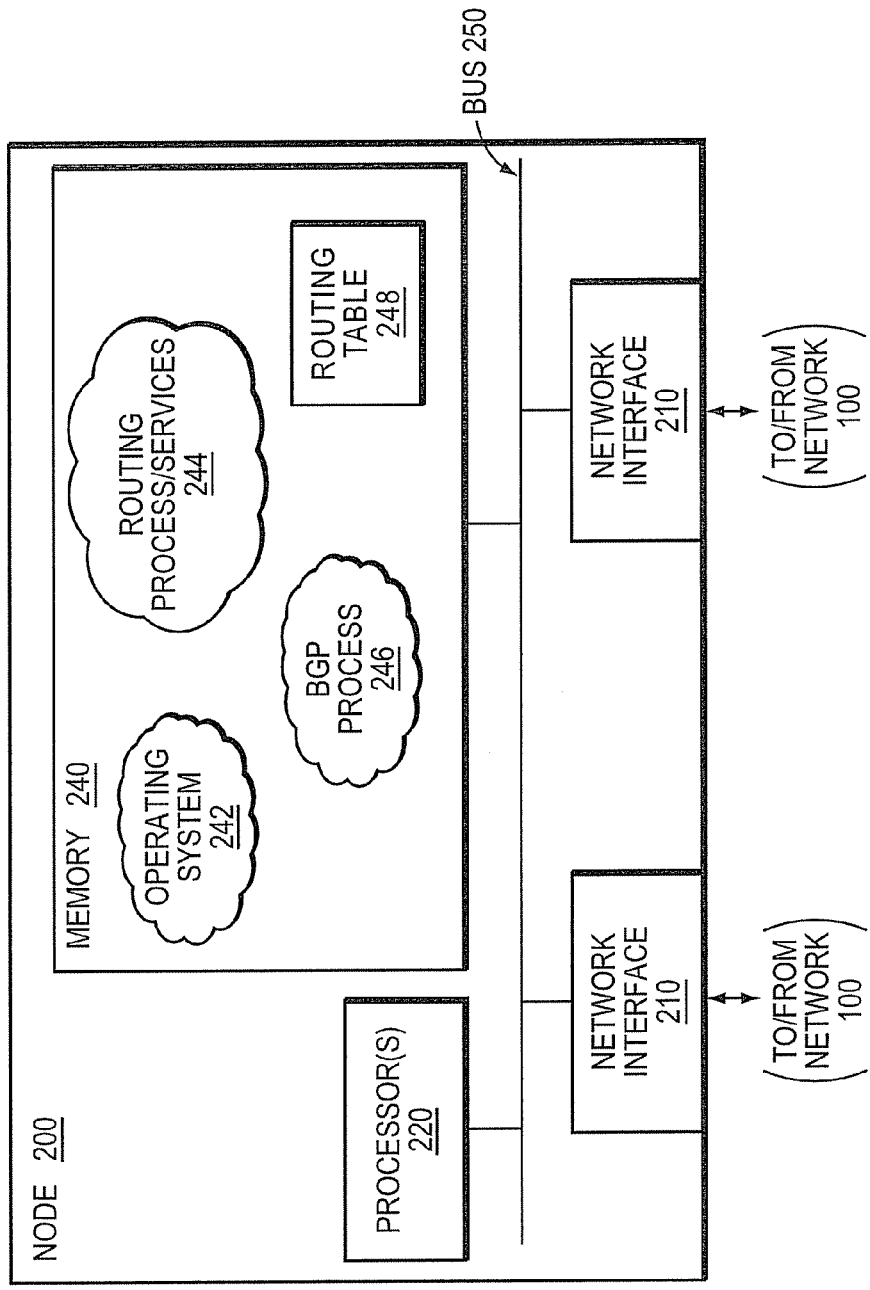
FIG. 2 illustrates an example intermediate node.

FIG. 2 is a schematic block diagram of an example intermediate node 200 that may be used with one or more embodiments described herein as e.g., router reflector. The node may comprise a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may also be configured to transmit and/or receive data using a variety of different communication protocols, including, inter alia, BGP and TCP/IP. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures, such as routing table 248. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the node. These software processes and/or services may comprise routing process/services 244 configured to perform functions provided by one or more routing protocols (e.g., TCP/IP) and BGP process 246 configured to implement the customized best path selection technique described herein, as well as other processes not explicitly shown. It will be apparent to those skilled in the art that other types of processors and memory, including various computer-readable media, may be used to store and execute program instructions pertaining to the techniques described herein. Also, while the embodiments herein are described in terms of processes or services stored in memory, alternative embodiments also includes the processes described herein being embodied as modules consisting of hardware, software, firmware, or combinations thereof.

BGP process 246 contains computer executable instructions executed by processor 220 to perform functions provided by the BGP protocol, as well as additional functions described herein. The routers configured to execute an implementation of the BGP protocol, e.g., route reflectors, perform various routing functions including transmitting and receiving routing messages and rendering routing decisions based on routing metrics. Each router maintains routing table 248 that lists best paths throughout an autonomous system in accordance with a route selection calculation. Periodic refreshing of the routing table is generally not performed; however, peering routers residing in the autonomous system exchange routing information under certain circumstances. For example, when a router initially connects to the network, the peering routers exchange the entire contents of their routing tables. Thereafter when changes occur to those contents, the routers exchange only those portions of their routing tables that change in order to update their peers' tables. These update messages are thus incremental update messages sent in response to changes to the contents of the routing tables and advertise a best path in the autonomous system.

Broadly stated, a router generates routing update messages for an adjacency or peering router by "walking-through" the routing table 248 and applying appropriate routing policies. A routing policy is information that enables a router to rank routes according to filtering and preference (i.e., the "best route"). Routing updates provided by the update messages allow the routers of the autonomous system to construct a consistent view of the network topology. The update messages are typically sent using a reliable transport, such as TCP, to ensure reliable delivery. TCP is a transport protocol implemented by a transport layer of the IP architecture; the term TCP/IP is commonly used to denote this architecture. The TCP/IP architecture is well known and described in *Computer Networks*, 3rd *Edition*, Sections 1.4 and Section 6.4 by Andrew S. Tanenbaum, published by Prentice-Hall (1996).

Figure 3:
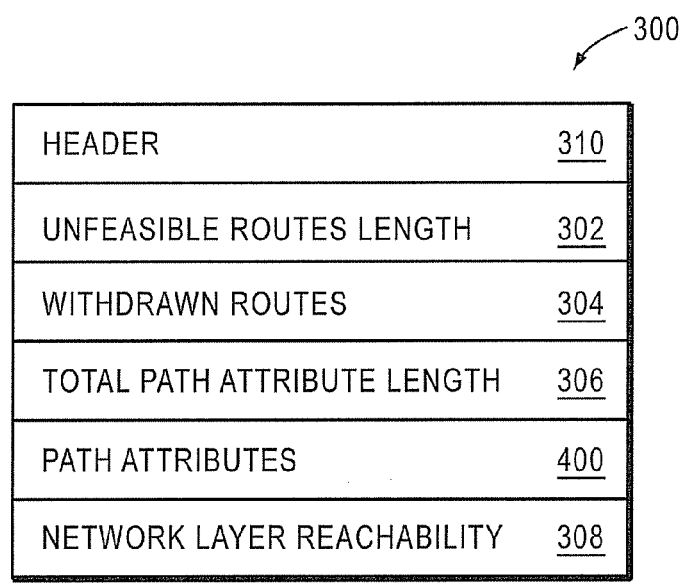
FIG. 3 illustrates an example BGP update message.

FIG. 3 is a schematic block diagram of a BGP update message 300 comprising a plurality of fields appended to a header 310. An unfeasible routes length field 302 indicates the total length of a withdrawn routes field 304, which illustratively contains a list of IP address prefixes for the routes being withdrawn from service. A total path attribute length field 306 indicates the total length of a path attributes field 400 and a network layer reachability information field 308 illustratively contains a list of IP (IPv4 or IPv6) address prefixes.

Note that the combination of a set of path attributes and a prefix is referred to as a "route"; the terms "route" and "path" may be used interchangeably herein. The format and function of the update message 300 is described in *RFC* 1771 and *Interconnections, Bridges and Routers*.

Figure 4:
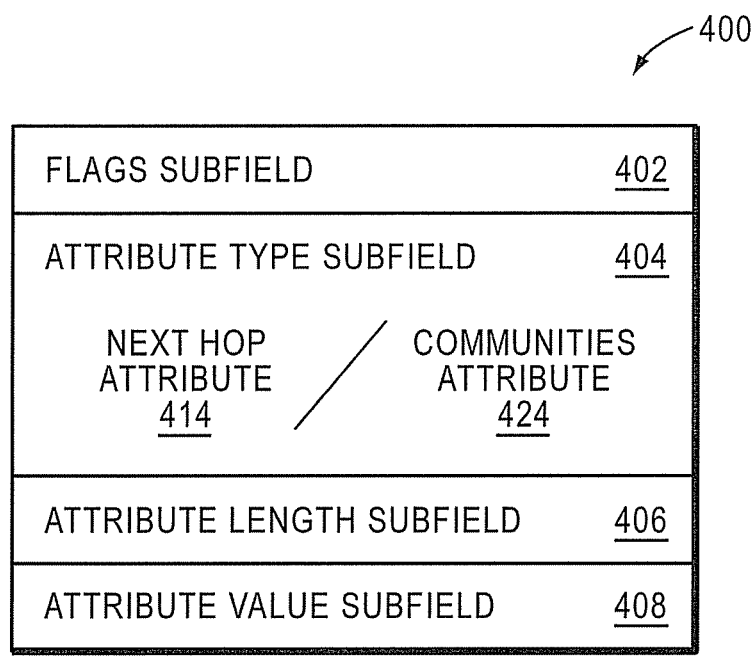
FIG. 4 illustrates a example path attributes field of a BGP update message.

Specifically, the path attributes field 400 comprises a sequence of fields, each describing a path attribute in the form of a triple (i.e., attribute type, attribute length, attribute value). FIG. 4 is a schematic block diagram of the path attributes field 400 comprising a plurality of subfields including a flags subfield 402, an attribute type subfield 404, an attribute length subfield 406 and an attribute value subfield 408. In particular, the attribute type subfield 404 specifies a plurality of attribute type codes, examples of which include codes for a next hop attribute 414 and a communities attribute 424, which may comprise a set of opaque 32-bit tags that can apply to a route. Note that the path attributes are derived from a combination of configuration and protocol (i.e., propagated from the BGP protocol) information.

Route Selection

Route selection, as described herein, utilizes a distance vector (Bellman-Ford) algorithm or, more specifically, a BGP best path selection (path vector) algorithm. According to the BGP standard a router, e.g., a route reflector client, may announce to its peer, e.g., a route reflector, the routes it uses for its own forwarding. As a result of these announcements, the router reflector may gather from its peers two or more routes for reaching a destination in an autonomous system of the network. For example, the route reflector may have learned two or more different egress points for reaching a particular destination address prefix. The BGP best path selection algorithm is a way of choosing one of the egress points as part of a "best path" to the destination address prefix, and using it to render forwarding decisions. Note that in the case of multi-path BGP, more than one path may be chosen as best by the algorithm.

Broadly stated, the illustrative BGP customized best path selection algorithm may modify the conventional BGP best path selection algorithm. Specifically, the novel technique described herein substitutes an angular distance calculation, as will be described in detail below, for the conventional lowest IGP metric to the BGP next hop, in selecting a best path at the route reflector for a route reflector client. For example, in the exemplary embodiment, the customized best path selection algorithm may comprise the following steps in selecting a best path to a destination address prefix:

1. Prefer the path with the largest WEIGHT; note that WEIGHT is a locally specified parameter, i.e., local to the router on which it is configured;
2. Prefer the path with the largest LOCAL_PREF;
3. Prefer the path that was locally originated via a network or aggregate BGP subcommand, or through redistribution from an interior gateway protocol (IGP);
4. Prefer the path with the shortest AS_PATH;
5. Prefer the path with the lowest origin type, e.g., IGP is lower than exterior gateway protocol (EGP), and EGP is lower than INCOMPLETE;
6. Prefer the path with the lowest MED among routes with identical AS;
7. Prefer external (eBGP) over internal (iBGP) paths;
8. Prefer the path with the lowest angular distance;
9. Prefer the route coming from the BGP router with the lowest router ID (BGP identifier);
10. If the originator or router ID is the same for multiple paths, prefer the path with the minimum cluster ID length; and
11. Prefer the path coming from the lowest neighbor (peer) address.

It should be noted that such steps, and their order, are only exemplary in nature and that the customized best path selection algorithm may be any BGP best path selection algorithm that utilizes the angular distance calculation (e.g., step 8), that is described in further detail below.

Angular Distance Calculation

Figure 5:
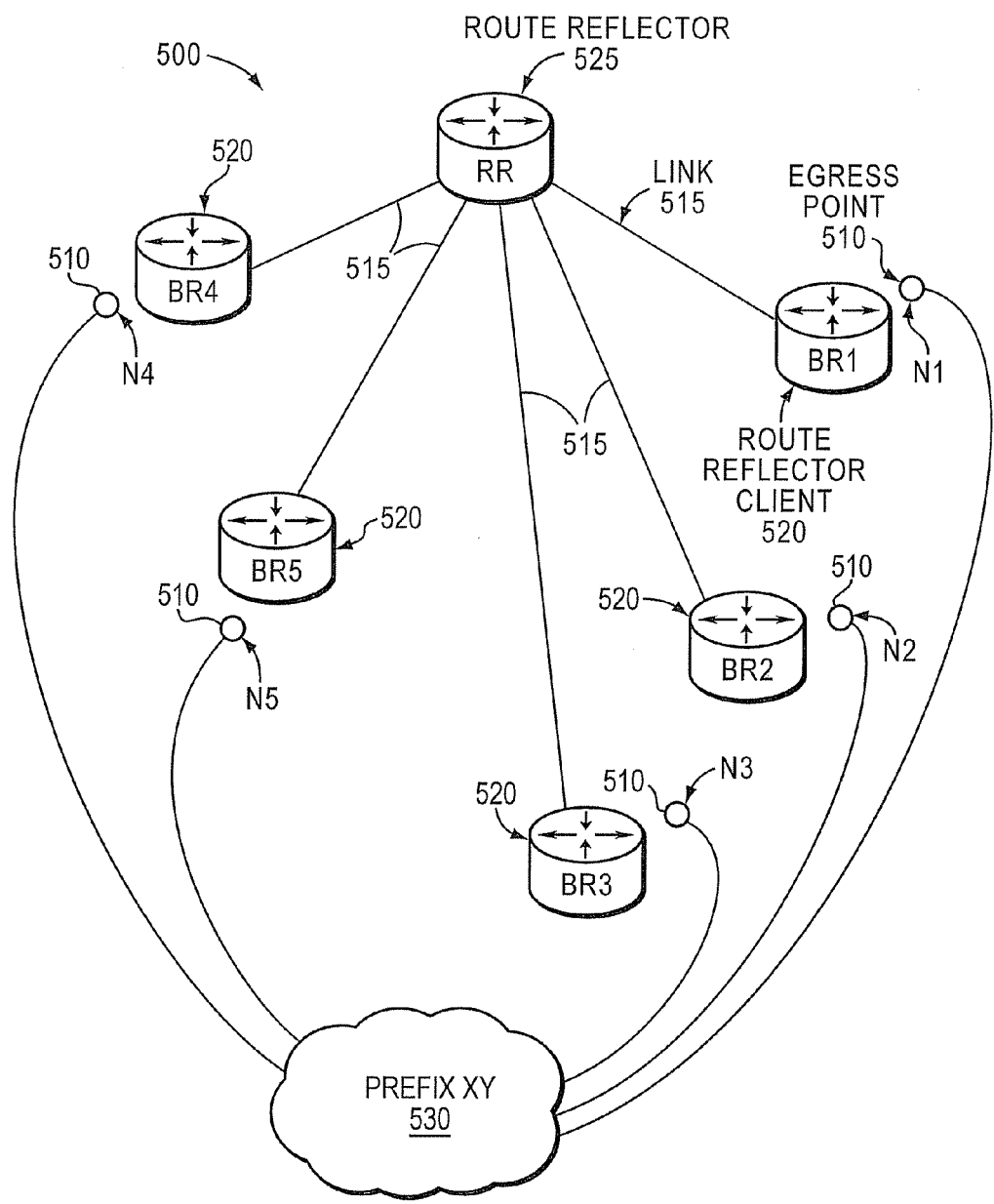
FIG. 5 illustrates an example autonomous system having a destination address prefix reachable through egress points.

FIG. 5 illustrates an example autonomous system 500 having a destination address prefix XY 530 reachable through egress points 510 (e.g., N1-N5) that are associated with route reflector clients 520 embodied as border routers BR1-BR5. In an illustrative embodiment, the route reflector clients 520 (e.g., BR1-BR5) are interconnected with route reflector 525 (e.g., RR) by links 515, and the destination address prefix XY is reachable through all the egress points 510 respectively associated with each border router. Those skilled in the art will understand that any number of nodes, devices, and links may be used in the computer network, and that the view shown herein is exemplary in nature.

Hot potato routing is an attempt to render a best path routing decision that directs the data traffic to an egress point (associated with a destination address prefix) of the autonomous system that is closest to the router, e.g., a route reflector 525, rendering the decision. As used herein, an egress point is simply an exit point of the autonomous system that may be utilized to reach a destination address prefix. Typically, the route reflector may render its decision based upon a position of the egress point with respect to itself, rather than the position of the egress point with respect to its peering router, i.e., a route reflector client 520 deployed on the perimeter of the autonomous system 500. Therefore, the egress point associated with the best path rendered and advertised by the route reflector 525 to the route reflector client 520 may not be the best path to the destination address prefix.

Assume route reflector client BR4 and route reflector client BR5 desire to route traffic to destination address prefix XY. Using the conventional best path selection algorithm, the route reflector 525 may select and advertise N1 (e.g., an address prefix associated with N1) to BR4 and BR5 as the egress point associated with a best path to destination address prefix XY. The selection of N1 rendered by the route reflector may be based, at least in part, on the fact that egress point N1 is the closest egress point to the route reflector (e.g., lowest IGP metric to the BGP next hop). However, N5 is the closest egress point to route reflector client BR5. Similarly, N4 is the closest egress point to route reflector client BR4. Accordingly, the selection of N1 as the egress point may not be the best path to destination address prefix XY and the novel angular distance calculation technique for customized best path selection, as described herein, addresses such deficiency.

According to one or more embodiments of the disclosure, an angular distance calculation technique may enable an intermediate node, such as a route reflector 525, to render customized best path selection decisions to destination address prefixes and advertise those decisions to its intermediate peering nodes, i.e., route reflector clients 520, in autonomous system 500 of a computer network. That is, the route reflector may execute a routing protocol, such as BGP, to select and advertise a next hop (e.g., an address prefix of an egress point of the autonomous system) associated with a customized best path to a route reflector client based on an angular distance between the route reflector client and the egress point. In this manner, and according to the embodiments described herein, the route reflector client may route data traffic destined to a destination address prefix utilizing the egress point associated with the customized best path to that prefix.

Specifically, a topology of the autonomous system may be configured as a set of elements (e.g., route reflector clients and egress points) arranged in a closed plane curve, (e.g., a circle), such that an angular distance between a route reflector client 520 and each egress point 510 for a destination address prefix can be determined. Each angular distance may thereafter be utilized in a customized best path selection calculation executed by the route reflector 525 to select a closest egress point associated with a customized best path to the destination address prefix for the route reflector client. In an illustrative embodiment, the egress point that produces the smallest angular distance with the route reflector client may be deemed the closest egress point and thus associated with the customized best path. The route reflector may then advertise the customized best path to the route reflector client. Advantageously, the route reflector client may route traffic to the destination address prefix utilizing an egress point that is closest to the client in accordance with a customized best path, instead of an egress point that is closest to the route reflector.

According to the illustrative angular distance calculation technique, an angular position may be assigned to each route reflector client (e.g., BR1-BR5) and each egress point (e.g., N1-N5) on a closed plane curve (e.g., a circle) by, e.g., a system administrator, wherein the angular north of the "circle" may be 0 degrees. It should be noted that utilizing 0 degrees north as a "reference point" is exemplarily in nature, and any other value or position may be used. In the network shown in FIGS. 5-6 and relative to the fixed position of 0 degrees angular north of circle 600, egress point N1 may have an angular position of 60 degrees, egress point N2 may have an angular position of 85 degrees, egress point N3 may have an angular position of 120 degrees, egress point N4 may have an angular position of 290 degrees, and egress point N5 may have an angular position of 260 degrees. Further, the angular position of route reflector client BR5 may be 260 degrees, and the angular position of route reflector client BR4 may be 290 degrees. These angular positions may, for example, be assigned such values and conveyed to the route reflector 525 in a number of ways. For example, the angular position of each route reflector client 520 and egress point 510 may be assigned, e.g., by the administrator, through configuration on the route reflector itself. Further, the angular position of each route reflector client and egress point may be assigned, e.g., by the administrator, at each route reflector client and egress point respectively, and subsequently propagated to the route reflector using, e.g., a communities attribute 424 contained within the path attributes field 400 of BGP update message 300.

Figure 6:
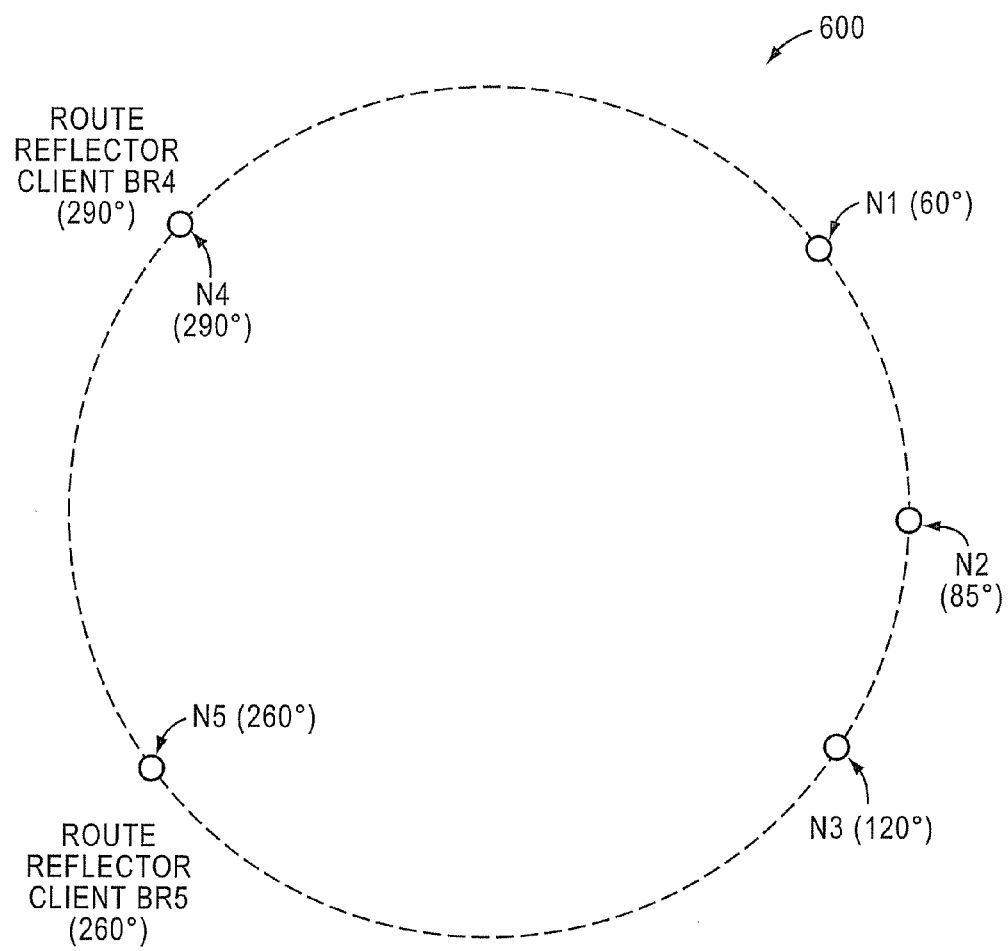
FIG. 6 illustrates an example autonomous system configured as a set of elements arranged in a closed plane curve wherein the elements have an angular position.

Thereafter, using the route reflector client's angular position and the angular position of the egress points originating a path to prefix XY, route reflector 525 may select a best path via a particular egress point that is best suited for (e.g., closest to) the route reflector client 520. For example, FIG. 6 illustrates the angular positions of route reflector clients BR4 and BR5 and the egress points N1-N5 of autonomous system 600 configured as a set of elements arranged in a closed plane curve (e.g., circle). The route reflector may calculate the angular difference by subtracting the angular position of the egress point from the angular position of the route reflector client. If the difference between such values produces a result that is less than or equal to 180, then the absolute value of that result may be the angular distance between the route reflector client and that egress point. However, if the difference between such values produces a result that is greater than 180, then angular distance for that particular egress point may be 360 degrees minus the result. For example, by subtracting the angular position of egress point N1, e.g., 60 degrees, from the angular position of route reflector client BR5, e.g., 260 degrees, a result of 200 degrees is obtained. Since the result of 200 degrees is greater than 180, the angular distance from route reflector client BR5 to N1 is 360 degrees minus 200 degrees, or 160 degrees. As another example, by subtracting the angular position of egress point N3, e.g., 120 degrees, from the angular position of route reflector client BR5, e.g., 260 degrees, a result of 140 is obtained. Since the result of 140 degrees is less than 180 degrees, the angular distance from route reflector client BR5 to N3 is the absolute value of the result, or 140 degrees. The following table illustrates the angular distance between route reflector client BR5 and each egress point, and route reflector client BR4 and each egress point, utilizing the values provided above and with reference to FIG. 6, that may be computed at the route reflector:

| Prefix X/Y | N1 | N2 | N3 | N4 | N5 |
|---|---|---|---|---|---|
| route reflector client BR5 | 160 | 175 | 140 | 30 | 0 |
| route reflector client BR4 | 130 | 155 | 170 | 0 | 30 |

In accordance with the customized best path selection algorithm that uses the novel angular distance calculation, each route reflector client 520 may be provided with a "best path" that includes the egress point 510 closest to the route reflector client. Specifically, and with reference to the angular distance values calculated above, the closest egress point to route reflector client BR5 may be N5 and the closest egress point for route reflector client BR4 may be N4. That is, of the angular distance values calculated with respect to each egress point and route reflector client BR5, egress point N5 produces the smallest angular distance, e.g., 0 degrees, and thus is the closest egress point. Similarly, of the angular distance values calculated with respect to each egress point and route reflector client BR5, egress point N4 produces the smallest angular distance, e.g., 0 degrees, and thus is the closest egress point. Therefore, the route reflector may advertise to route reflector client BR5, e.g., using a next hop attribute 414 contained within the path attributes field 400 of BGP update message 300, that egress point N5 is the closest egress point to route reflector client BR5 and, accordingly, is associated with a best path to the destination address prefix XY. Advantageously, route reflector client BR5 may route traffic to destination address prefix XY utilizing egress point N5 that is closest to the route reflector client BR5, and in accordance with a customized best path.

Figure 7:
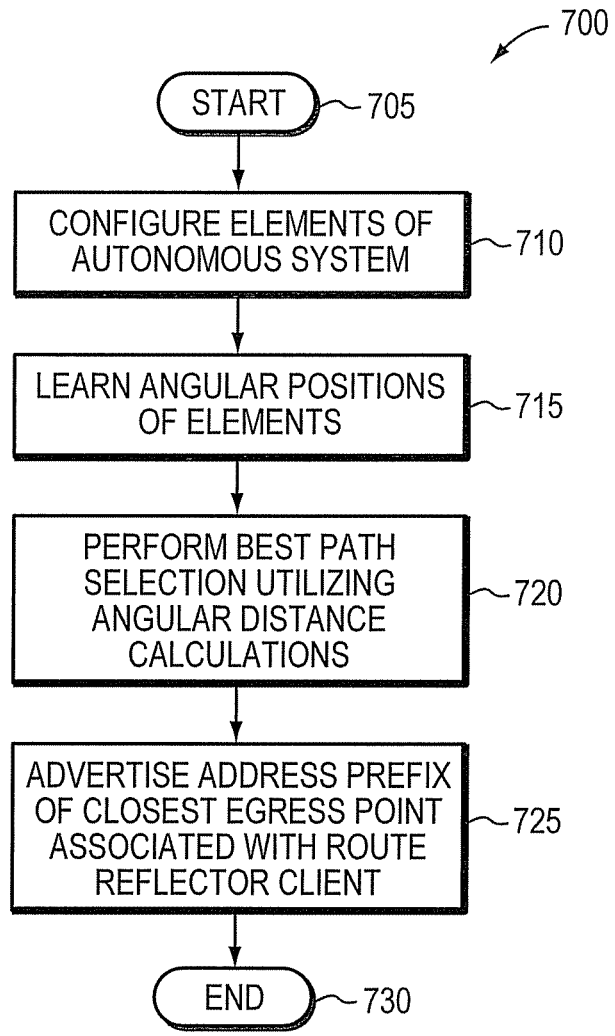
FIG. 7 illustrates an example simplified procedure for performing an angular distance calculation for a BGP best path selection in accordance with one or more embodiments described herein.

FIG. 7 illustrates an example procedure for performing an angular distance calculation for a BGP best path selection in accordance with one or more embodiments described herein. The procedure 700 starts at step 705 and continues to step 710 wherein route reflector clients and egress points associated with an autonomous system of a computer network, may be configured as a set of elements in a closed curve (e.g., a circle). In step 715, the angular positions of the elements may be learned at the route reflector, where the positions may be assigned by an administrator, and/or conveyed from a route reflector client to the route reflector. In step 720, the route reflector may perform the BGP customized best path selection utilizing the angular distance calculation between a route reflector client's angular position and each egress point's angular position that is associated with a destination address prefix to determine the egress point closest to the route reflector client and, thus, associated with the customized best path to the destination address prefix. In step 725, the route reflector may advertise an address prefix of the closest egress point, associated with the best path, to the route reflector client, thus allowing the route reflector client to route traffic to the destination address prefix in accordance with the best path utilizing the closest egress point to the route reflector client. The procedure then ends at step 730.

While there has been shown and described illustrative embodiments of utilizing an angular distance calculation for a BGP customized best path selection, it is to be understood that various other adaptations and modifications may be made within the spirit and scope of the embodiments disclosed herein. For example, instead of advertising a single address prefix of an egress point, e.g., next hop, associated with a best path to a route reflector client, a route reflector may advertise multiple address prefixes of multiple egress points, e.g., next hops, associated with an additional paths ("add paths") capability to the route reflector client. Specifically, the route reflector and route reflector client may establish a session that is add paths capable (e.g., through an open message exchange between the route reflector and route reflector client). After the route reflector and route reflector client have negotiated the add paths capability, the router reflector may advertise multiple, e.g., two, address prefixes of egress points associated with a best path and a next best path to the route reflector client in one update message session. Moreover, the add paths advertisement may be utilized between route reflectors in the same domain to exchange address prefixes of egress points associated with a best path and a next best path to a destination address prefix. Add paths capabilities are well known and described in detail in "Advertisement of Multiple Paths in BGP," http://tools.ietf.org/html/draft-ietf-idr-add-paths-04, Juniper networks, by Walton et al., expiring January 2009.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on one or more tangible (non-transitory) computer-readable storage media (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    performing, by a node including a processor, a customized best path computation for a peering node on a perimeter of an autonomous system in a computer network to reach a destination address prefix, wherein the customized best path computation includes:
        calculating a plurality of angular distances between a first angular position assigned to the peering node and a plurality of other angular positions assigned to a plurality of egress points of the autonomous system, wherein the destination address prefix is reachable from the plurality of egress points;
        determining which of the calculated plurality of angular distances is a smallest angular distance, wherein the smallest angular distance is associated with a particular egress point of the plurality of egress points; and
        advertising, from the node to the peering node, an address prefix associated with the particular egress point to indicate that the particular egress point is associated with a customized best path to the destination address prefix.

2. The method of claim 1, wherein the first angular position and the plurality of other angular positions are assigned as degree values between 0 degrees and 360 degrees.

3. The method of claim 1, wherein the node is route reflector.

4. The method of claim 3, further comprising:
    exchanging, between the route reflector and a different route reflector in the autonomous system, one or more address prefixes associated with one or more egress points of the plurality of egress points utilizing add paths capabilities.

5. The method of claim 1, wherein the peering node is a route reflector client.

6. The method of claim 1, wherein the smallest angular distance indicates that the particular egress point is a closest egress point to the peering node.

7. The method of claim 1, wherein the customized best path computation is a Border Gateway Protocol best path selection algorithm.

8. The method of claim 1, further comprising:
    transmitting data from the peering node to the destination address prefix utilizing the address prefix associated with the particular egress point.

9. The method of claim 1, wherein the particular egress point is a border router, a provider edge, or a point of presence.

10. An apparatus, comprising:
    one or more network interfaces adapted to communicate data, including an advertisement, over an autonomous system of a computer network;
    a processor coupled to the network interfaces and adapted to execute one or more processes; and
    a memory configured to store a customized best path process executable by the processor, the customized best path process when executed operable to:
        calculate a plurality of angular distances between a first angular position assigned to a peering node in the autonomous system and a plurality of other angular positions assigned to a plurality of egress points of the autonomous system, wherein a destination address prefix is reachable from the plurality of egress points;
        determine which of the plurality of calculated angular distances is a smallest angular distance, wherein the smallest angular distance is associated with a first egress point of the plurality of egress points; and
        advertise a first address prefix associated with the first egress point, wherein the first egress point is associated with a customized best path to the destination address prefix for the peering node.

11. The apparatus of claim 10, wherein the customized best path process when executed is further operable to:
    determine which of the plurality of calculated angular distances is a second smallest angular distance, wherein the second smallest angular distance is associated with a second egress point of the plurality of egress points; and
    advertise a second address prefix associated with the second egress point, wherein the second egress point is associated with a customized next best path to the destination address prefix for the peering node.

12. The apparatus of claim 11, wherein the first address prefix associated with the first egress point and the second address prefix associated with the second egress point are advertised in a single message session utilizing add paths capabilities.

13. The apparatus of claim 10, wherein the first angular position and the plurality of other angular positions are assigned as degree values between 0 degrees and 360 degrees.

14. The apparatus of claim 10, wherein the customized best path process when executed is further operable to:
  receive, through one or more update messages, the angular position assigned to the peering node and the plurality of other angular positions assigned to the plurality of egress points.

15. The apparatus of claim 10, wherein the smallest angular distance indicates that the first egress point is a closest egress point to the peering node.

16. The apparatus of claim 10, wherein the apparatus is route reflector.

17. The apparatus of claim 10, wherein the peering node is a route reflector client.

18. The apparatus of claim 10, wherein the customized best path process when executed is further operable to:
  configure the autonomous system including the peering node and the plurality of egress points as a set of elements in a closed curve.

19. The apparatus of claim 10, wherein the customized best path process when executed is further operable to:
  utilize a Border Gateway Protocol message in advertising the first egress point of the plurality of egress points.

20. A tangible, non-transitory, computer-readable media having software encoded thereon, the software when executed by a processor operable to:
  calculate a plurality of angular distances between a first angular position assigned to a peering node in an autonomous system of a computer network and a plurality of other angular positions assigned to a plurality of egress points of the autonomous system, wherein a destination address prefix is reachable from the plurality of egress points;
  determine which of the plurality of calculated angular distances is a smallest angular distance, wherein the smallest angular distance is associated with a particular egress point of the plurality of egress points; and
  advertise an address prefix associated with the particular egress point of the plurality of egress points, wherein the particular egress point is associated with a customized best path to the destination address prefix for the peering node.

* * * * *